(12) United States Patent
Rubinsztajn

(10) Patent No.: US 7,405,246 B2
(45) Date of Patent: *Jul. 29, 2008

(54) CURE SYSTEM, ADHESIVE SYSTEM, ELECTRONIC DEVICE

(75) Inventor: Slawomir Rubinsztajn, Niskayuna, NY (US)

(73) Assignee: Momentive Performance Materials Inc., Wilton, CT (US)

( * ) Notice: Subject to any disclaimer, the term of this patent is extended or adjusted under 35 U.S.C. 154(b) by 291 days.

This patent is subject to a terminal disclaimer.

(21) Appl. No.: 11/165,092

(22) Filed: Jun. 23, 2005

(65) Prior Publication Data

US 2006/0223933 A1 Oct. 5, 2006

Related U.S. Application Data

(60) Provisional application No. 60/668,651, filed on Apr. 5, 2005.

(51) Int. Cl.
*C08K 9/02* (2006.01)
*C08K 9/00* (2006.01)
*B32B 27/04* (2006.01)
*B32B 27/38* (2006.01)
*C08K 9/04* (2006.01)

(52) U.S. Cl. ............... 523/216; 523/200; 523/427; 523/440; 523/443; 523/445; 523/456; 523/466; 523/457; 524/80; 524/81; 524/261; 524/266; 428/355 R; 428/355 EP; 428/402; 428/413

(58) Field of Classification Search ........ 523/200, 523/216, 427, 440, 443, 445, 456, 466, 467, 523/457; 428/402, 413, 355 R, 355 EP; 524/80, 81, 261, 267

See application file for complete search history.

(56) References Cited

U.S. PATENT DOCUMENTS

| 3,338,871 | A | 8/1967 | Vogelz |
| 3,479,317 | A | 11/1969 | Ferington |
| 3,666,695 | A | 5/1972 | Jachimowicz et al. |
| 3,864,426 | A | 2/1975 | Salensky |
| 3,956,214 | A | 5/1976 | Tate et al. |
| 4,026,862 | A | 5/1977 | Smith et al. |
| 4,042,550 | A | 8/1977 | Tuller et al. |
| 4,066,625 | A | 1/1978 | Bolger |
| 4,178,274 | A | 12/1979 | Denk et al. |
| 4,217,438 | A | 8/1980 | Brunelle et al. |
| 4,331,582 | A | 5/1982 | Babayan |
| 4,336,367 | A | 6/1982 | Morris et al. |
| 4,496,687 | A | 1/1985 | Okada et al. |
| 4,521,490 | A | 6/1985 | Pocius et al. |
| 4,684,678 | A | 8/1987 | Schultz et al. |
| 4,692,272 | A | 9/1987 | Goswami et al. |
| 4,869,772 | A | 9/1989 | McDonnell et al. |
| 4,999,699 | A | 3/1991 | Christie et al. |
| 5,121,190 | A | 6/1992 | Hsiao et al. |
| 5,128,746 | A | 7/1992 | Pennisi et al. |
| 5,145,889 | A | 9/1992 | Wada et al. |
| 5,194,930 | A | 3/1993 | Papathomas et al. |
| 5,212,261 | A | 5/1993 | Stierman |
| 5,376,403 | A | 12/1994 | Capote |
| 5,417,771 | A | 5/1995 | Arita et al. |
| 5,471,027 | A | 11/1995 | Call et al. |
| 5,580,655 | A | 12/1996 | El-Shall et al. |
| 5,616,633 | A | 4/1997 | Wombwell et al. |
| 5,644,003 | A | 7/1997 | Arai et al. |
| 5,700,581 | A | 12/1997 | Sachdev et al. |
| 5,821,456 | A | 10/1998 | Willie et al. |
| 5,985,043 | A | 11/1999 | Zhou et al. |
| 6,010,577 | A | 1/2000 | Bristol et al. |
| 6,017,634 | A | 1/2000 | Capote et al. |
| 6,059,894 | A | 5/2000 | Pendse |
| 6,103,379 | A | 8/2000 | Margel et al. |
| 6,132,646 | A | 10/2000 | Zhou et al. |
| 6,180,696 | B1 | 1/2001 | Wong et al. |
| 6,194,788 | B1 | 2/2001 | Gilleo et al. |
| 6,210,811 | B1 | 4/2001 | Honda et al. |
| 6,232,264 | B1 | 5/2001 | Lukehart et al. |
| 6,235,865 | B1 | 5/2001 | Shimizu et al. |
| 6,372,839 | B1 | 4/2002 | Ito et al. |
| 6,379,799 | B1 | 4/2002 | Almen |
| 6,380,322 | B1 | 4/2002 | Wong et al. |
| 6,437,026 | B1 | 8/2002 | Garrett |
| 6,444,495 | B1 | 9/2002 | Leung et al. |
| 6,458,472 | B1 | 10/2002 | Konarski et al. |
| 6,467,676 | B1 | 10/2002 | Wang |
| 6,486,235 | B2 | 11/2002 | Cooray et al. |

(Continued)

FOREIGN PATENT DOCUMENTS

CA 1094706 1/1981

(Continued)

OTHER PUBLICATIONS

U.S. Appl. No. 11/155,990, filed Jun. 2005, Campbell.

(Continued)

*Primary Examiner*—Sanza L McClendon
(74) *Attorney, Agent, or Firm*—Dominick G. Vicari

(57) ABSTRACT

A cure system including a compatiblized and passivated refectory solid dispersed within a low temperature liquid curing agent is provided. An adhesive system including the cure system is provided, and an associated method. A device including the cured adhesive system is provided.

27 Claims, No Drawings

U.S. PATENT DOCUMENTS

| | | |
|---|---|---|
| 6,492,438 B1 | 12/2002 | Nomura |
| 6,500,544 B1 | 12/2002 | Tiitu et al. |
| 6,531,704 B2 | 3/2003 | Yadav et al. |
| 6,548,189 B1 | 4/2003 | Gunasekaran et al. |
| 6,554,609 B2 | 4/2003 | Yadav et al. |
| 6,555,602 B1 | 4/2003 | Harada et al. |
| 6,570,029 B2 | 5/2003 | Wang et al. |
| 6,576,355 B2 | 6/2003 | Yadav et al. |
| 6,576,718 B1 | 6/2003 | Yeager et al. |
| 6,607,821 B2 | 8/2003 | Yadav et al. |
| 6,617,400 B2 | 9/2003 | Yeager et al. |
| 6,617,401 B2 | 9/2003 | Rubinsztajn |
| 6,620,512 B2 | 9/2003 | Jayaraman et al. |
| 6,624,213 B2 | 9/2003 | George et al. |
| 6,624,216 B2 | 9/2003 | Morganelli et al. |
| 6,689,469 B2 | 2/2004 | Wang et al. |
| 6,706,417 B2 | 3/2004 | Konarski et al. |
| 6,710,011 B2 | 3/2004 | Mamedov et al. |
| 6,773,958 B1 | 8/2004 | Wang |
| 6,794,761 B2 | 9/2004 | Shi et al. |
| 6,809,162 B2 | 10/2004 | Rubinsztajn |
| 6,822,341 B1 | 11/2004 | Ahsan |
| 6,830,822 B2 | 12/2004 | Yadav |
| 6,849,109 B2 | 2/2005 | Yadav et al. |
| 6,866,741 B2 | 3/2005 | Chan |
| 7,022,410 B2 | 4/2006 | Tonapi |
| 7,041,736 B2 | 5/2006 | Jayaraman et al. |
| 7,202,304 B2 | 4/2007 | Jayaraman et al. |
| 2002/137260 A1 | 9/2002 | Leung et al. |
| 2003/0004268 A1 | 1/2003 | Sundararaj et al. |
| 2003/0071368 A1 | 4/2003 | Rubinsztajn |
| 2003/0124353 A1 | 7/2003 | Wang et al. |
| 2003/0198810 A1 | 10/2003 | Wang et al. |
| 2003/0218258 A1 | 11/2003 | Charles et al. |
| 2004/0101688 A1 | 5/2004 | Rubinsztajn |
| 2004/0102529 A1 | 5/2004 | Campbell |
| 2004/0159328 A1 | 8/2004 | Hajaligol et al. |
| 2004/0180203 A1 | 9/2004 | Yadav et al. |
| 2004/0192947 A1 | 9/2004 | Chane-Ching et al. |
| 2004/0228967 A1 | 11/2004 | Leung et al. |
| 2005/0048291 A1 | 3/2005 | Woo et al. |
| 2005/0049334 A1 | 3/2005 | Rubinsztajn |
| 2005/0049350 A1 | 3/2005 | Tonapi et al. |
| 2005/0049352 A1 | 3/2005 | Rubinsztajn et al. |
| 2005/0049357 A1 | 3/2005 | Zhong et al. |
| 2005/0065023 A1 | 3/2005 | Deevi et al. |
| 2005/0113489 A1 | 5/2005 | Baran, Jr. et al. |
| 2005/0131106 A1* | 6/2005 | Tonapi et al. ............... 523/216 |
| 2005/0170188 A1* | 8/2005 | Campbell et al. ........... 428/413 |
| 2005/0266263 A1* | 12/2005 | Campbell et al. ........... 428/624 |
| 2006/0125119 A1* | 6/2006 | Xiao et al. .................. 257/793 |
| 2006/0147719 A1* | 7/2006 | Rubinsztajn et al. ....... 428/413 |
| 2006/0219757 A1* | 10/2006 | Rubinsztajn ................ 228/101 |

FOREIGN PATENT DOCUMENTS

| | | |
|---|---|---|
| EP | 0 038 292 | 10/1981 |
| GB | 1 104 870 | 3/1968 |
| GB | 2 221 684 | 2/1990 |
| WO | WO 91/06594 | 5/1991 |

OTHER PUBLICATIONS

U.S. Appl. No. 10/654,378, filed Sep. 2003, Rubinsztajn.
U.S. Appl. No. 10/737,943, filed Dec. 2003, Rubinsztajn.
U.S. Appl. No. 11/096,160, filed Apr. 2005, Campbell.

* cited by examiner

CURE SYSTEM, ADHESIVE SYSTEM, ELECTRONIC DEVICE

CROSS REFERENCE TO RELATED APPLICATIONS

This application claims benefit and priority to U.S. Provisional patent application Ser. No. 60/668,651, filed Apr. 5, 2005. The entire contents of which are hereby incorporated by reference.

BACKGROUND

The invention includes embodiments that relate to a cure system and an adhesive system. The invention includes embodiments that relate to an electronic device made using the cure system and adhesive system.

Semiconductor chips may be mounted to a substrate in an electronic device. The mounting may not be perfect and air-filled gaps may result between a surface of the chip and a surface of the mounting substrate. Because the air gaps may be undesirable, an underfill resin may be used to fill in the gaps. Underfill material may be used to improve reliability of the device. Further, the use of an underfill material may improve a fatigue life of solder bumps in an assembly.

To address shortcomings associated with traditional capillary underfill resins, a No-Flow Underfill (NFU) material was developed. No-Flow Underfill may include a curable resin, such as an epoxy resin, and may be unfilled, or filled with nano-size filler. The resin filler may be functionalized colloidal silica. The higher the filler content in the resin, the closer may be a match of the coefficient of thermal expansion (CTE) of the cured resin relative to a semiconductor chip. Unfortunately, for reasons of processability and the like, filler loadings of more than about 50 weight percent in the uncured resin may be problematic. To exacerbate the situation, after the addition of a curing agent, the final filler loading may be below 30 weight percent of the total composition. A typical CTE of a cured no-flow underfill epoxy resin with filler loading below 30 weight percent may be above 50 ppm/° C.

It may be desirable to have an underfill material having one or more of a coefficient of thermal expansion of less than 50 ppm/° C., a filler loading of greater than 30 weight percent, an acceptable level of processability, transparency, or a desirably high glass transition temperature (Tg). It may be desirable to have a process for making and/or using an underfill material system having improved or different properties than are currently available. It may be desirable to have an apparatus or article employing a no-flow underfill material system having improved or different properties than are currently available.

BRIEF DESCRIPTION

In one embodiment in accordance with the invention, a hardener or curing agent system may include a compatiblized and passivated refectory solid dispersed within a hardener or a curing agent, which are liquid at low temperature.

In another embodiment, an adhesive system may include the cure system mixed with a curable epoxy resin.

According to another embodiment, a method may include dispersing a compatiblized and passivated refectory solid into a mixture or solution of a liquid curing agent and a low boiling solvent. The solvent may be free of hydroxyl-groups. The solvent may be removed from the mixture or solution to form a solvent-free liquid dispersion of curing agent and the compatiblized and passivated refectory solid. One embodiment provides an electronic device produced by the method.

An embodiment of the invention may include a solvent-free adhesive system for use in an electronic device. The adhesive system may include a curable epoxy resin and a cure system. The epoxy resin may include a first portion of compatiblized and passivated refectory solid. The cure system may include a low temperature liquid curing agent and a second portion of compatiblized and passivated refectory solid, and may cure the resin. The compatiblized and passivated refectory solid may be present in an amount greater than about 30 percent by weight relative to the total weight of the adhesive system.

In one embodiment, an electronic device may include a substrate, a chip secured to the substrate, and a cured adhesive system according to embodiments of the invention disposed between the chip and the substrate.

DETAILED DESCRIPTION

The invention includes embodiments that relate to a cure system comprising a compatiblized and passivated refectory solid and a hardener or a curing agent (collectively "curing agent"). The curing agent may be liquid or fluid at a low temperature. The invention includes embodiments that relate to methods of making and/or using the cure system. In one embodiment, an adhesive system includes the cure system in combination with a curable resin. Other embodiments relate to electronic devices made using the adhesive system.

As used herein, cured refers to a curable composition having reactive groups in which more than half of the reactive groups have reacted or cross linked; curing agent refers to a material that may interact with a curable resin to crosslink monomers in a resin system, such as an epoxy resin. Approximating language, as used herein throughout the specification and claims, may be applied to modify any quantitative representation that could permissibly vary without resulting in a change in the basic function to which it is related. Accordingly, a value modified by a term or terms, such as "about", may not to be limited to the precise value specified. In at least some instances, the approximating language may correspond to the precision of an instrument for measuring the value.

Hydroxyl-free, hydroxyl-group free, solvent-free, no-flow, and the like include a complete absence of the indicated material or property, and further include a substantial absence of the indicated material. That is, the "no-" and "-free" modifiers, and the like, are not used in a strict or absolute sense and may contain insignificant, trace, residual or minimal amounts of the indicated material or property unless context or language indicates otherwise. Derivatives may include conjugate acids or salts. Stability, as used herein in the specification and claims, refers to the lack of reaction, or the lack thereof, of active termination sites on the surface of the refractory solid and the curing agent over a period of time, e.g., one week, two weeks, and the like. The term "functionalized" may refer to a material in which initially functional groups have been manipulated or affected in some manner, such as reacted with a compatibilizing material or a passivating material.

In one embodiment, a room temperature liquid cure system may include a compatiblized and passivated refectory solid and a liquid curing agent. The cure system may be combined with a curable resin to initiate cure of the resin, that is, to crosslink reactive monomers contained in the resin. Particularly, the compatiblized and passivated refectory solid may be homogeneously dispersed into a low temperature liquid curing agent as filler to form the cure system. In one embodiment, the cure system may be combined with a curable resin to form an adhesive system. The adhesive system may cure quickly after combining, may have a pot life that extends for hours or days, or may have an indefinite pot life or desirable shelf life until a further triggering event occurs, such as the application of energy to the adhesive system. Such energy may include thermal energy, e-beam energy, UV light, and the like.

Suitable compatiblized and passivated refectory solid may include a plurality of particles of one or more metal, metalloid, ceramic, or organic material. Refractory may include materials with a high melting temperature, such as melting temperatures in a range of greater than about 1000 degrees Celsius. In one embodiment, the solid may include aluminum, antimony, arsenic, beryllium, boron, carbon, chromium, copper, gallium, gold, germanium, indium, iron, hafnium, magnesium, manganese, molybdenum, phosphorous, silicon, silver, titanium, tungsten, or zirconium, or the like, or an alloy of two or more thereof. In one embodiment, the solid may include one or more of arsenic, aluminum, boron, gallium, germanium, silicon, titanium, or an oxide or nitride thereof, such as alumina, silica, titania, boron nitride, and the like. For ease of reference, silica may be used as a non-limiting example of a suitable solide. Silica may include colloidal silica (CS), fused silica, or fumed silica, and the like.

Prior to compatibilizing and passivating, a suitable solid oxide may have an active surface termination site that comprises a silanol or hydroxyl group. A suitable solid nitride may have the active surface termination site include an amide or an imide. Subesquent to compatibilizing and passivating, the density of active termination sites may be controlled to be in a predetermined range. For example, with colloidal nanoparticle silica the active termination site density may be about 5 active sites per square nanometer ($OH/nm^2$) or less, about 4.75 $OH/nm^2$ or less, or in a range of from about 50 $H/nm^2$ to about 10 $H/nm^2$, from about 50 $H/nm^2$ to about 3 $OH/nm^2$, or from about 4.5 $OH/nm^2$ to about 4.0 $OH/nm^2$. Because the active termination site density may correspond to shelf life or stability, a suitable stability ratio (the ratio of viscosity (two weeks/initial)), may be less than about 5, less than about 4, less than about 3 less than about 2, or about 1.

As noted hereinabove, compatibilizing and passivating or capping active termination sites may be accomplished by, for example, a sequential treatment. A first portion of active surface termination sites may be reacted with a compatiblizing composition. A suitable compatiblizing composition may include those disclosed hereinabove, such as an alkoxysilane having an organic moiety that may be one or more of acrylate, alkyl, phenyl, cyclohexyloxy, or glycidyl. Of the remaining active termination sites, a second portion may be reacted with a passivating composition, such as a silazane or other capping agent as disclosed herein.

A suitable water dispersion of colloidal silica for use as a precursor to compatiblized and passivated colloidal silica may be commercially obtained from, for example, Nissan Chemical America Corporation (Houston, Tex.) under the tradename SNOWTEX, or NALCO 1034A, which is available from Nalco Chemical Company (Napier, Ill.). SNOWTEX 40 has an average particle size in a range of from about 10 nanometers to about 30 nanometers.

The refectory solid initially may be hydrophilic or somewhat incompatible with an organic or non-polar phase due to the presence of active termination sites on the particle surface. For example, colloidal silica may be hydrophilic due to the presence of silanol groups at the surface. The hydrophilicity may make dispersion in an organic phase problematic or impracticable. Compatiblizing the solid surface may create an organophilic coating on the surface of the solid particles to make the particles dispersible in, or compatible with, an organic phase or a non-polar liquid. Compatiblizing may be accomplished with, for example, a trialkoxy organosilanes (e.g., phenyl trimethoxy silane, glycidoxy propyl trimethoxy silane, and the like). To reduce further the content or density of active termination sites on the surface, the compatiblized refectory solid may be post treated or reacted with a capping agent or a passivating agent. The reaction with the capping agent may form particles with a relatively low content of available hydroxyl or silanol groups. As disclosed above, such functional groups may be referred to as active termination sites.

A compatibilized refectory solid may be further treated or capped with one or more capping agent for passivation. Suitable capping agents may include one or more of a triorganosilane, an organodisilazane, organoalkoxysilane, or an organohalosilane such as organochlorosilane. In one embodiment, the capping agent may include one or more of hexamethyl disilazane (HMDZ), tetramethyl disilazane, divinyl tetramethyl disilazane, diphenyl tetramethyl disilazane, N-(trimethyl silyl) diethylamine, 1-(trimethyl silyl) imidazole, trimethyl chlorosilane, pentamethyl chloro disiloxane, trimethylmethoxysilane and pentamethyl disiloxane, and the like.

An acid, a base, or a condensation catalyst may be used to promote condensation of, for example, silanol groups on a silica particle surface and an alkoxy silane group to compatiblize the silica particle. Suitable condensation catalysts may include organo-titanate and organo-tin compounds such as tetrabutyl titanate, titanium isopropoxy bis (acetyl acetonate), dibutyltin dilaurate, and the like, or combinations of two or more thereof.

The compatiblized and passivated (e.g., capped) particles may have a relatively reduced number and/or density of active termination sites on the particle surface. The reduced number or reduced density may provide a stable dispersion of particles in a curing agent, a curable resin, or a mixture of both curing agent and curable resin. Further, reduced density of active termination sites (e.g., hydroxyl content on compatiblized and passivated silica) may reduce or eliminate reactions with an anhydride, which may otherwise react with, for example, available hydroxyl groups. Such anhydride/hydroxyl reactions may form a free acid. Thus, reducing or eliminating active termination sites, such as by passivation, may reduce or eliminate free acid formation and may increase stability.

The amount of refectory solid present in a cure system may be expressed as a weight percent of the total weight. The refectory solid may be present in a cure system in an amount greater than about 0.5 weight percent, or in a range of from about 0.5 weight percent to about 80 weight percent. In one embodiment, the refectory solid content may be present in a cure system in an amount in a range of from about 1 weight percent to about 5 weight percent, from about 5 weight percent to about 10 weight percent, from about 10 weight percent to about 20 weight percent, from about 20 weight percent to about 30 weight percent, from about 30 weight percent to about 40 weight percent, from about 40 weight percent to about 50 weight percent, from about 50 weight percent to about 60 weight percent, or greater than 60 weight percent.

Suitable refractory solids may have a surface area greater than about 20 square meters per gram, greater than about 60 square meters per gram, or greater than about 150 square meters per gram. The solid may include a plurality of nanoparticles having an average diameter in a range of from about 1 nanometer to about 100 nanometers. In one embodiment, the refractory solids may have an average particle size of less than about 1 micrometer to about 500 nanometers, from about 500 nanometers to about 250 nanometers, from about 250 nanometers to about 100 nanometers, from about 100 nanometers to about 50 nanometers, from about 50 nanometers to about 25 nanometers, from about 25 nanometers to about 10 nanometers, from about 10 nanometers to about 5 nanometer, or less than about 5 nanometer.

Suitable particles may have one or more of a spherical, amorphous or geometric morphology. In one embodiment, the particles may be amorphous. Suitable particles may be porous, may be non-porous, or may include some porous and some non-porous particles. The pores may be uniform in shape or size, or may be shaped and/or sized differently from each other.

A suitable low temperature liquid curing agent may include an anhydride, such as carboxylic acid anhydride, with a relatively low melt point (below about 100 degrees Celsius) or that may be liquid at about room temperature. Low temperature may include temperatures in a range of less than about 100 degrees Celsius, and particularly may include temperatures in a range of less than about 50 degrees Celsius. In one embodiment, the curing agent is a flowable liquid in a temperature range of from about 25 degrees Celsius to about 35 degrees Celsius.

Liquid refers to a property of being fluid or able to flow or thermoplastically deform. A measure of fluidity may be expressed as viscosity, which is the degree to which a fluid may resist flow under an applied force, as measured by the tangential friction force per unit area divided by the velocity gradient under conditions of streamline flow. In one embodiment, the cure system at low temperature may have a Brookfield viscosity of less than about 1000 Poise, in a range of from 1000 Poise about to about 100 Poise, from about 100 Poise to about 1000 centipoise, from about 1000 centipoise, or less than about 1000 centipoise. Viscosity may be measured according to ASTM D-2393-67, which is incorporated herein by reference. The viscosity may differ from embodiment to embodiment, for example, in response to changes in filler loading or type, temperature, and selection of curing agent.

Suitable liquid or low melting temperature anhydrides may include one or more aromatic anhydride, aliphatic anhydride, or cycloaliphatic anhydride. The curing agent may include one or more carboxylic acid anhydrides, which may be selected from aromatic carboxylic acid anhydride, aliphatic carboxylic acid anhydride, or cycloaliphatic carboxylic acid anhydride. Carboxylic anhydrides may be prepared by reacting a carboxylic acid with an acyl halide, or by dehydrating a carboxylic acid, that is, eliminate water between two carboxylic acid molecules to form the anhydride. Alternatively, carboxylic acid anhydrides may be obtained commercially from common chemical suppliers.

Aromatic anhydrides may include one or more of benzoic anhydride; phthalic anhydride; 4-nitrophthalic anhydride; naphthalene tetracarboxylic acid dianhydride; naphthalic anhydride; tetrahydro phthalic anhydride; derivatives thereof; and the like. In one embodiment, a curing agent may include one or more aromatic carboxylic acid anhydrides. Cycloaliphatic anhydrides may include one or more of cyclohexane dicarboxylic anhydride, hexahydro phthalic anhydride, methyl-hexahydro phthalic anhydride (MHHPA), derivatives thereof, and the like. In one embodiment, a curing agent may include 5,5'-(1,1,3,3,5,-hexamethyl-1,5-trisiloxane diyl) bis [hexahydro-4,7-methanoisobenzofuran-1,3-dione] (TriSNBA), which is commercially available from GE Silicones (Waterford, N.Y.).

Structures of some other suitable anhydrides are shown below.

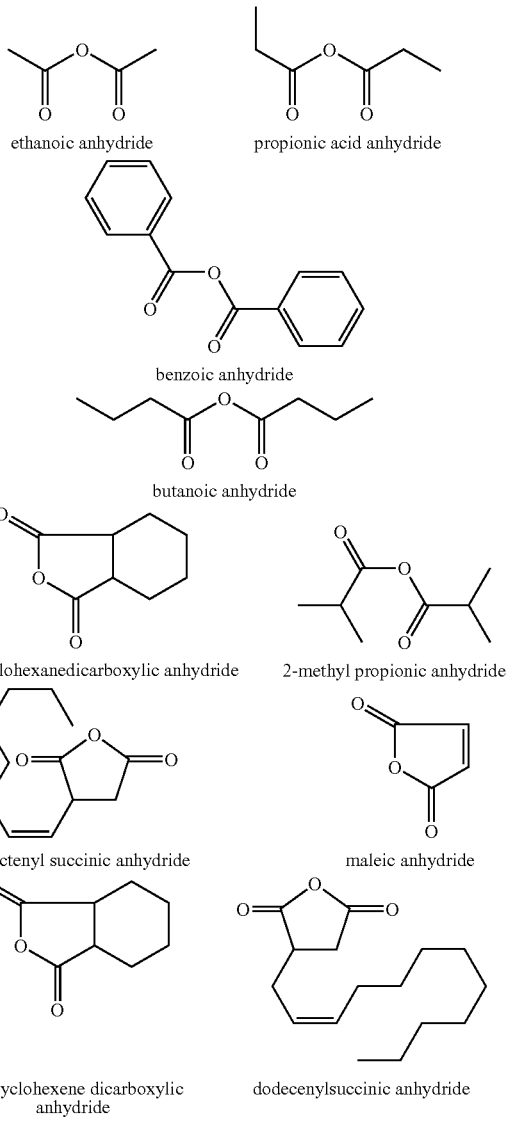

ethanoic anhydride      propionic acid anhydride benzoic anhydride butanoic anhydride 1,2-cyclohexanedicarboxylic anhydride      2-methyl propionic anhydride n-octenyl succinic anhydride      maleic anhydride 1,2-cyclohexene dicarboxylic anhydride      dodecenylsuccinic anhydride In one embodiment, a curing agent may include one or more of butanoic anhydride; dodecenyl succinic anhydride; 2,2-dimethyl glutaric anhydride; ethanoic anhydride; glutaric anhydride; hexafluoro glutaric acid anhydride; itaconic anhydride; tetrapropenylsuccinic anhydride; maleic anhydride; 2-methyl glutaric anhydride; 2-methyl propionic anhydride 1,2-cyclohexane dicarboxylic anhydride; octadecyl succinic anhydride; 2-or n-octenyl succinic anhydride; 2-phenylglutaric anhydride; propionic acid anhydride; 3,3-tetramethylene glutaric anhydride; derivatives thereof; and the like.

The cure system may be blended, dispersed and/or mixed into a curable resin to form an adhesive system. In one embodiment, the resin may have a filler pre-dispersed therein. That is, prior to mixing both the cure system and the resin system each have a high content of refractory solids dispersed therein.

Suitable resins may include one or more aliphatic epoxy resins, cycloaliphatic epoxy resins, or aromatic epoxy resins. Suitable aliphatic epoxy resins may include one or more of butadiene dioxide, dimethyl pentane dioxide, diglycidyl ether, 1,4-butanediol diglycidyl ether, diethylene glycol diglycidyl ether, and dipentene dioxide, and the like. Suitable aliphatic epoxy monomers may include one or more of butadiene dioxide, dimethylpentane dioxide, diglycidyl ether, 1,4-butanediol diglycidyl ether, diethylene glycol diglycidyl ether, or dipentene dioxide, and the like. In one embodiment, the aliphatic dioxirane monomer may include CYRACURE UVR 6105, which is commercially available from Dow Chemical (Midland, Mich.).

Suitable cycloaliphatic epoxy resins may include one or more of 3-cyclohexenyl methyl-3-cyclohexenyl carboxylate diepoxide; 2-(3,4-epoxy) cyclohexyl-5,5-(3,4-epoxy) cyclohexane-m-dioxane; 3,4-epoxy cyclohexyl alkyl-3,4-epoxy cyclohexane carboxylate; 3,4-epoxy-6-methyl cyclohexyl methyl-3,4-epoxy-6-methyl cyclo hexane carboxylate; vinyl cyclohexane dioxide; bis (3,4-epoxy cyclohexyl methyl) adipate; bis (3,4-epoxy-6-methyl cyclohexyl methyl) adipate; bis (2,3-epoxy cyclopentyl) ether; 2,2-bis (4-(2,3-epoxy propoxy) cyclohexyl) propane; 2,6-bis (2,3-epoxy propoxy cyclohexyl-p-dioxane); 2,6-bis (2,3-epoxy propoxy) norbornene; diglycidyl ether of linoleic acid dimer; limonene dioxide; 2,2-bis (3,4-epoxy cyclohexyl) propane; dicyclopentadiene dioxide; 1,2-epoxy-6-(2,3-epoxy propoxy) hexahydro-4,7-methanoindane; p-(2,3-epoxy) cyclopentyl phenyl-2,3-epoxypropyl ether; 1-(2,3-epoxy propoxy) phenyl-5,6-epoxy hexahydro-4,7-methanoindane; (2,3-epoxy) cyclopentyl phenyl-2,3-epoxy propyl ether); 1,2-bis (5-(1,2-epoxy)-4,7-hexahydro methano indanoxyl) ethane; cyclopentenyl phenyl glycidyl ether; cyclohexane diol diglycidyl ether; diglycidyl hexahydrophthalate; and 3-cyclohexenyl methyl-3-cyclohexenyl carboxylate diepoxide; and the like. In one embodiment, a cycloaliphatic epoxy monomer may include one or more 3-cyclohexenyl methyl-3-cyclohexenyl carboxylate diepoxide, 3-(1,2-epoxy ethyl)-7-oxabicyclo-heptane; hexanedioic acid, bis (7-oxabicyclo heptyl methyl) ester; 2-(7-oxabicyclohept-3-yl)-spiro-(1,3-dioxa-5,3'-(7)-oxabicyclo heptane; and methyl 3,4-epoxy cyclohexane carboxylate, and the like.

Suitable aromatic epoxy resins may include one or more of bisphenol-A epoxy resins, bisphenol-F epoxy resins, phenol novolac epoxy resins, cresol-novolac epoxy resins, biphenol epoxy resins, biphenyl epoxy resins, 4,4'-biphenyl epoxy resins, polyfunctional epoxy resins, divinylbenzene dioxide, resorcinol diglyciyl ether, and 2-glycidyl phenyl glycidyl ether. Other suitable resins may include silicone-epoxy resins and siloxane epoxy resins. Bisphenol-F resins may be commerically available from Resolution Performance Products (Pueblo, Colo.).

Optional additives may be incorporated into the resin portion of the system, the curing agent portion of the system, or both. Suitable additives may include one or more catalyst, accelerator, flexibilizer, carbinol, organic diluent, fire retardant, pigment, thermally conductive filler, electrically conductive filler, thermally insulative filler, electrically insulative filler, and the like.

A suitable catalyst or accelerator may initiate a crosslinking process, accelerate cure rate, or decrease cure time or temperature of an adhesive system. A catalyst or accelerator may be present in an amount less than about 10 parts per million (ppm), in a range of from about 10 ppm to about 100 ppm, from about 100 ppm to about 0.1 weight percent, from about 0.1 weight percent to about 1 weight percent, or greater than about 1 weight percent of the total formulation weight.

A suitable catalyst or an accelerator may include, but is not limited to, an onium catalyst or a free-radical generating compound. Suitable onium catalysts may include bisaryliodonium salts (e.g. bis (dodecyl phenyl) iodonium hexafluoro antimonate, (octyl oxyphenyl phenyl) iodonium hexafluoro antimonate, bisaryl iodonium tetrakis (penta fluorophenyl) borate), triaryl sulphonium salts, and combinations of two or more thereof. Suitable free-radical generating compounds may include one or more aromatic pinacols, benzoinalkyl ethers, organic peroxides, and the like. The presence of a free radical generating compound may enable decomposition of an onium salt at a relatively lower temperature.

In one embodiment, a catalyst or an accelerator may be added to an epoxy-based adhesive system. Useful catalysts or accelerators may include one or more amine; alkyl-substituted imidazole; imidazolium salt; phosphine; metal salt, such as aluminum acetyl acetonate (Al(AcAc)$_3$); salt of nitrogen-containing compound; and the like. The nitrogen-containing compound may include, for example, one or more amine compounds, di-aza compounds, tri-aza compounds, polyamine compounds and the like. A salt of a nitrogen-containing compound may include, for example 1,8-diazabicyclo (5,4,0)-7-undecane. The salt of the nitrogen-containing compounds may be obtained commercially, for example, as POLYCAT SA-1 or POLYCAT SA-102. POLYCAT SA-1 is a delayed-action, heat-activated catalyst based on the cyclic amine, 1,8 diaza-bicyclo (5,4,0) undec-ene-7. POLYCAT SA-1 contains DBU catalyst and an organic acid "blocker". POLYCAT is a trademark of Air Products and Chemicals, Inc (Allentown, Pa.). Other suitable catalysts may include triphenyl phosphine (TPP), N-methylimidazole (NMI), and/or dibutyl tin dilaurate (DiButSn).

Additives, such as flexibilizers, may include one or more organic compounds having a hydroxyl-containing moiety. Suitable flexibilizers may include one or more of polyol or bisphenol. The polyol may be straight chain, branched, cycloaliphatic, or aromatic and may contain from about 2 to about 100 carbon atoms. Examples of such polyfunctional alcohols may include one or more of ethylene glycol; propylene glycol; 2,2-dimethyl-1,3-propane diol; 2-ethyl, 2-methyl, 1,3-propane diol; 1,3-pentane diol; 1,5-pentane diol; dipropylene glycol; 2-methyl-1,5-pentane diol; 1,6-hexane diol; dimethanol decalin, dimethanol bicyclo octane; 1,4-cyclohexane dimethanol; triethylene glycol; and 1,10-decane diol. In one embodiment, an alcohol may include 3-ethyl-3-hydroxymethyl oxetane (commercially available as UVR6000 from Dow Chemicals (Midland, Mich.)).

Suitable bisphenols may include one or more dihydroxy-substituted aromatic hydrocarbon. In one embodiment, a dihydroxy-substituted aromatic compound may include one or more of 4,4'-(3,3,5-trimethyl cyclohexylidene)-diphenol; 2,2-bis (4-hydroxyphenyl) propane (bisphenol A); 2,2-bis (4-hydroxyphenyl) methane (bisphenol F); 2,2-bis (4-hydroxyl-3,5-dimethylphenyl) propane; 2,4'-dihydroxy diphenylmethane; bis (2-hydroxyphenyl) methane; bis (4-hydroxyphenyl) methane; bis (4-hydroxyl-5-nitrophenyl) methane; bis (4-hydroxyl-2,6-dimethyl-3-methoxyphenyl) methane; 1,1-bis (4-hydroxyphenyl) ethane; 1,1-bis (4-hydroxyl-2-chlorophenyl) ethane; 2,2-bis (3-phenyl-4-hydroxyphenyl) propane; bis (4-hydroxyphenyl) cyclohexyl methane; 2,2-bis (4-hydroxyphenyl)-1-phenylpropane; 2,2,2',2'-tetrahydro-3,3,3',3'-tetramethyl, 1'-spirobi{1H-indene}-6,6'-diol (SBI); 2,2-bis (4-hydroxyl-3-methylphenyl) propane (DMBPC); and C1-C13 alkyl-substituted resorcinols, and the like.

A suitable organic diluent may be added to an adhesive system according to embodiments of the invention. The organic diluent may decrease a viscosity of the adhesive system. Suitable reactive diluents may include, but are not limited to, dodecylglycidyl ether, 4-vinyl-1-cyclohexane diepoxide, and di (beta-(3,4-epoxy cyclohexyl) ethyl) tetramethyl disiloxane, or combinations of two or more thereof. Other diluents may include monofunctional epoxies and/or compounds containing at least one epoxy functionality. Such diluents may include, but are not limited to, alkyl derivatives of phenol glycidyl ethers such as 3-(2-nonylphenyloxy)-1,2-epoxy propane or 3-(4-nonylphenyloxy) 1,2-epoxy propane; glycidyl ethers of phenol; substituted phenols such as 2-methylphenol, 4-methyl phenol, 3-methylphenol, 2-butylphenol, 4-butylphenol, 3-octylphenol, 4-octylphenol, 4-t-butylphenol, 4phenylphenol, and 4-(phenyl isopropylidene) phenol; and the like. In one embodiment, the reactive diluent may include 3-ethyl-3-hydroxymethyl-oxetane, which is commercially available as UVR6000 from Dow Chemical (Midland, Mich.).

A suitable flame retardant may include one or more material that contains phosphorus, iron, halogen, oxide, or hydroxide. In one embodiment, a flame retardant additive may include phosphoramide, triphenyl phosphate (TPP), resorcinol diphosphate (RDP), bisphenol A disphosphate (BPA-DP), organic phosphine oxide, halogenated resin (e.g., tetrabromobisphenol A), metal oxide (e.g. bismuth oxide), metal hydroxide (e.g., MgOH), and combinations of two or more thereof. Suitable pigment may include one or both of reactive and non-reactive materials.

In one embodiment, a cure system may be produced by dispersion of: refractory solids (e.g. CS) into a liquid curing agent and a solvent to form a solution. A suitable solvent may include a hydroxyl-group free solvent, such as propylene glycol methyl ether acetate, toluene, xylene, supercritical fluid (e.g., SCF $CO_2$), and the like.

After the dispersion or mixing, the solvent may be removed. Suitable solvent removal methods may include affecting the temperature and/or pressure to volatilize the solvent. That is, heat, vacuum, or both may be used to extract or remove the solvent from the dispersion. If a supercritical fluid, such as supercritical carbon dioxide, is used, room temperature and pressure may be sufficient to remove the solvent. Subsequently, a solvent-free filled low temperature liquid cure system according to an embodiment of the invention may be recovered and stored.

In one embodiment, a cure system further may be mixed with a curable resin to form an adhesive system. The resulting adhesive system may have a flowable or workable viscosity for a predetermined time, i.e., pot life. For a no-flow underfill application, the viscosity may be such to allow flow of the underfill during dispensing on the substrate and formation of solder electrical connection during a reflow process. Viscosity selection may be made by one or more of determining amounts of refractory solids in the resin, amounts of refractory solids in the cure system, the initial unfilled viscosity of the resin and/or cure system, temperature, the presence or amount of additives or flow-modifiers, control over working pressure, use of sonic vibrations, and the like.

The adhesive system according to embodiments of the invention may be used in an electronic device. In one embodiment, the adhesive system may be used as an underfill material, such as a no-flow underfill, in a flip chip assembly to secure a chip to a substrate. The adhesive system may exhibit one or more of: prolonged room temperature stability, desirable solder ball fluxing, and a coefficient of thermal expansion below about 50 ppm/° C. when cured and used as, for example, an encapsulant or an underfill. In one embodiment, a cured adhesive system may have properties that include one or more of a low CTE (below about 40 ppm/° C.), self-fluxing properties during application, a high Tg (above about 100 degrees Celsius), a high heat deflection temperature (HDT), and relatively high optical transparency.

An embodiment of the invention may provide a no-flow underfill material having a coefficient of thermal expansion, when cured, of less than 50 ppm/° C., in a range of from about 50 ppm/° C. to about 40 ppm/° C., from about 40 ppm/° C. to about 30 ppm/° C., or less than about 30 ppm/° C. An embodiment may enable a final filler loading of greater than 30 weight percent, a range of from about 30 weight percent to about 40 weight percent, from about 40 weight percent to about 50 weight percent, or greater than about 50 weight percent, while maintaining one or more of an acceptable level of processability, transparency, or a desirably high glass transition temperature (Tg). Processability relates to properties that may include flowability, viscosity, visco-elasticity, tack, wetability, out-gassing, percent void, shelf life, cure time, cure temperature, and the like. Transparency relates to the property of permitting the relatively free passage of electromagnetic radiation through a pre-determined thickness of material without one or more refraction, reflection or absorption. Glass transition temperature relates to an inflection point on a plot of modulus versus temperature. The Tg indicates a temperature range above which a material may undergo plastic deformation, or may change from a rigid or brittle state to a rubbery or softened state.

In one embodiment, an adhesive system may be a no-flow underfill, a capillary flow underfill, a wafer level underfill, a thermal interface material (TIM), and/or pre-applied and optionally B-staged on a substrate, and may be dispensable and have utility in the fabrication of an electronic device, such as a computer, an optical device, or a semiconductor assembly. As an underfill material or encapsulant, the adhesive system may reinforce physical, mechanical, and electrical properties of solder bumps that may secure a chip to a substrate, and/or may act as flux during solder bump melting.

No-flow underfilling may include dispensing an underfill encapsulant material on the substrate or semiconductor device and performing solder bump reflowing simultaneously with underfill encapsulant curing. Wafer level underfilling may include dispensing underfill materials onto the wafer before dicing into individual chips that are subsequently mounted in the final structure via flip-chip type-operations. Alternatively to no-flow underfill, dispensing the underfill material may include applying in a fillet or bead extending along at least one edge of a chip, and allowing the underfill material to flow by capillary action under the chip to fill all, or nearly all, gaps between the chip and the substrate.

In one embodiment, an adhesive according to embodiments of the invention may be energy cured, such as by heat, UV light, microwave energy, electron been energy, and the like. For heat or thermal curing, a suitable temperature may be in a range of from about 50 degrees Celsius to about 100 degrees Celsius, from about 100 degrees Celsius to about 200 degrees Celsius, from about 200 degrees Celsius to about 250 degrees Celsius, or greater than about 250 degrees Celsius. For no flow underfill, the cure temperature is in a range of from about 183 degrees Celsius (melting point of eutectic solder) to about 230 degrees Celsius for Sn/Pb eutectic solder and from about 230 degrees Celsius to about 260 degrees Celsius for lead-free solder. Curing may occur over a period of less than about 30 seconds, in a range between about 30 seconds and about 1 minute, from about 1 minute to about 5 minutes, from about 5 minutes to about 30 minutes, from about 30 minutes to about 1 hour, from about 1 hour to about 5 hours, or greater than about 5 hours. For no flow underfill a cure process (during a reflow) may be in a range of from about 3 minutes to about 10 minutes.

Optional post-curing may be performed at a temperature of less than 100 degrees Celsius, in a range of from about 100 degrees Celsius to about 150 degrees Celsius, or greater than about 150 degrees Celsius, over a period of less than one hour, in a range of from about 1 hour to about 4 hours, or greater than about 4 hours. For no-flow underfill, the post cure may be at a temperature in a range of from about 100 degrees Celsius to about 160 degrees Celsius over a period of from about 1 to about 4 hours. Other times, temperatures and pressures for curing and post-curing may be selected with reference to application specific parameters.

In one embodiment, a cure system according to an embodiment of the invention may consist essentially of a liquid curing agent and compatiblized and passivated silica. In another embodiment, a cure system may consist essentially of a liquid carboxylic acid anhydride curing agent, and compatiblized colloidal silica treated with a capping agent. In yet another embodiment, a cure system may consist essentially of a room temperature liquid anhydride-curing agent, and compatiblized and passivated colloidal silica having a nano-size average particle diameter.

EXAMPLES

The following examples are intended only to illustrate methods and embodiments in accordance with the invention, and as such should not be construed as imposing limitations upon the claims. Unless specified otherwise, all ingredients are commercially available from such common chemical suppliers as Alpha Aesar, Inc. (Ward Hill, Mass.), Sigma-Aldrich Corp. (St. Louis, Mo.), and the like.

Example 1

Preparation of Compatiblized and Passivated Solids

A mixture is made by adding 300 grams of SNOWTEX-ZL (80 nm average particle size) to 300 grams of isopropyl alcohol (IPA). After thoroughly mixing, 2 grams of phenyl trimethoxysilane ($Ph(OMe)_3Si$) is added to the mixture. The resulting mixture is refluxed for three hours. After reflux, the mixture is cooled to room temperature. The cooled mixture has 600 grams of methoxypropanol added while mixing, until thoroughly mixed. A stripping process removes 600 grams of volatile material, by weight. Hexamethyl disilazane (HMDZ) is added to the stripped mixture in an amount of 6 grams. The mixture is thoroughly mixed, refluxed for 1 hour at elevated temperature, and then stripped to 200 grams total weight. 300 grams of propylene glycol methyl ether acetate or 1-methoxy-2-acetoxypropane (PGMEA) is added and mixed thoroughly. The resulting mixture is stripped of 300 grams of volatile weight and filtered. The yield is 250 grams of compatiblized and passivated colloidal silica material having solids of 29.10 weight percent. The recovered sample is labeled Sample 1A. An ingredient list is shown in Table 1, below. The above disclosed process is repeated to form Sample 1B, the difference being that silica having an average particle size of 50 nm, rather than 80 nm, is used.

TABLE 1

Ingredient list for compatiblized and passivated solids (Sample 1A)

| INGREDIENT | AMOUNT (g) |
|---|---|
| Snowtex-ZL | 300 |
| Snowtex-ZL 80 nm particles, Conc. OH = 5/nm$^2$ | |
| IPA | 300 |

TABLE 1-continued

Ingredient list for compatiblized and passivated solids (Sample 1A)

| INGREDIENT | AMOUNT (g) |
|---|---|
| $Ph(OMe)_3Si$ | 2 |
| Methoxypropanol | 600 |
| HMDZ | 6 |
| PGMEA | 300 |
| Yield | 215 |
| Solids | 29.10% |
| Appearance | white liquid |

Example 2 through Example 4

Preparation of Cure System Including Compatiblized and Passivated Solids

The compatiblized and passivated colloidal silica materials produced in Example 1 (Samples 1A and 1B) are added to liquid anhydride materials methylhexahydrophthalic anhydride (MHHPA) and 5,5'-(1,1,3,3,5,-hexamethyl-1,5-trisiloxane diyl) bis [hexahydro-4,7-methanoisobenzofuran-1,3-dione] (TriSNBA) to form Samples 2-4. Samples 2-4 were evaporated using a commercially available rotary evaporator at 70 degrees Celsius. Rotary evaporators may be obtained from, for example, Thomas Industries, Inc. (Skokie, Ill.). An ingredient list for the cure systems containing compatiblized and passivated silica is shown in Table 2. A list of properties for the Samples 2-4 shown in Table 2 is shown is Table 3. The viscosity measurements are performed with SP # 40 at 10 rpm, and the results are in centipoise, unless otherwise indicated.

TABLE 2

Ingredient list for cure systems containing Samples 1A and 1B).

| | Sample 2 | Sample 3 | Sample 4 |
|---|---|---|---|
| Sample 1A (80 nm ave size) | 35 | 35 | — |
| Sample 1B (50 nm ave size) | — | — | 37.3 |
| MHHPA | 10 | — | 10 |
| TrisNBA/MHHPA (40/60 ratio) | — | 10 | — |

TABLE 3

Properties for cure systems (Samples 2-3) that contain Samples 1A and 1B.

| | Sample 2 | Sample 3 | Sample 4 |
|---|---|---|---|
| Appearance | yellow | yellow | light yellow |
| Mass | 20.15 | 20.06 | 20.1 |
| % solids | 50 | 50 | 50 |
| Viscosity (centipoise) | 600 | 3040 | 920 |

Example 5 and Example 6

Preparation of Adhesive Systems that Include a Cure System

An aliphatic dioxirane monomer, CYRACURE UVR 6105 is blended with Bisphenol F epoxy resin in a 75/25 ratio to form a base resin. A reactive diluent, UVR6000, is added to the base resin to form a mixture. A cure catalyst, POLYCAT SA-1, is added to the mixture of base resin and diluent to form a catalyzed mixture. The catalyzed mixture is blended with 60 weight percent of a cure system (Samples 2 or 3) at room temperature for approximately 10 minutes to form an adhesive system (Samples 5 and 6, respectively). After which, each adhesive system (Samples 5 and 6) is degassed at relatively high vacuum at room temperature for 20 minutes. Samples 5 and 6 are stored at negative 40 degrees Celsius.

For test and evaluation, Samples 5 and 6 are applied to a chip and to a substrate. The chip and substrate are set together to form an assembly. Thermal energy is applied to cure the adhesive systems, Samples 5 and 6. Test results are listed in Table 5. Viscosity is performed with spindle #40 at 20 rpm at room temperature, the results are in centipoise.

TABLE 4

Ingredient list for adhesive systems (Sample 5 and Sample 6) that each include a curable resin and a cure system.

| INGREDIENT | Sample 5 | Sample 6 |
| --- | --- | --- |
| Base Resin 1 | 5 | 5 |
| Sample 2 | 4.07 | — |
| Sample 3 | — | 5 |
| UV R6000 | 0.2 | 0.2 |
| Polycat SA-1 | 0.0188 | 0.0216 |

TABLE 5

Properties list for adhesive systems.

| Test | Sample 5 | Sample 6 |
| --- | --- | --- |
| Fluxing of eutectic solder | Good | Good |
| Viscosity (centipoise) | 4880 | 29700 |
| % solids | 53% | 52% |
| Tg TMA (° C.) | 138.0 | 154.0 |
| CTE-20-80 (ppm/° C.) | 36.0 | 39.0 |
| DSC peak (° C.) | 214.4 | 208.1 |
| DSC H onset (° C.) | 164.4 | 154.7 |
| DSC H (J/g) | 199.0 | 168.8 |
| DSC Tg (° C.) | 123.5 | 147.0 |

The foregoing examples are merely illustrative, serving to illustrate only some of the features of the invention. The appended claims are intended to claim the invention as broadly as it has been conceived and the examples herein presented are illustrative of selected embodiments from a manifold of all possible embodiments. Accordingly it is Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied, those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

What is claimed is:

1. A cure system, comprising:
   a curing agent that is a low temperature liquid; and
   a finely divided refractory solid, wherein the solid has an active termination site density that is less than about 5 per square nanometer and, wherein the solid is non-reactive relative to the curing agent.

2. The cure system as defined in claim 1, wherein the solid is compatibilized and passivated.

3. The cure system as defined in claim 2, wherein the curing agent comprises an anhydride.

4. The cure system as defined in claim 3, wherein the anhydride comprises one or more aromatic carboxylic acid anhydride, aliphatic carboxylic acid anhydride, cycloaliphatic carboxylic acid anhydride, or siloxane dianhydride.

5. The cure system as defined in claim 3, wherein the anhydride comprises one or more of benzoic anhydride; phthalic anhydride; hexahydro phthalic anhydride; methyl-hexahydro phthalic anhydride (MHHPA); 4-nitrophthalic anhydride; naphthalene tetracarboxylic acid dianhydride; naphthalic anhydride; tetrahydro phthalic anhydride; cyclo-hexane dicarboxylic anhydride; butanoic anhydride; dodece-nyl succinic anhydride; 2,2-dimethyl glutaric anhydride; ethanoic anhydride; glutaric anhydride; hexafluoro glutaric acid anhydride; itaconic anhydride; tetrapropenylsuccinic anhydride; maleic anhydride; 2-methyl glutaric anhydride; 2-methyl propionic anhydride 1,2-cyclohexane dicarboxylic anhydride; octadecyl succinic anhydride; 2-octenyl succinic anhydride; n-octenyl succinic anhydride; 2-phenylglutaric anhydride; propionic acid anhydride; 3,3-tetramethylene glutaric anhydride; or derivatives thereof.

6. The cure system as defined in claim 1, wherein the curing agent is a liquid at a temperature in a range of less that about 100 degrees Celsius.

7. The cure system as defined in claim 6, wherein the curing agent is a liquid at a temperature in a range of less that about 50 degrees Celsius.

8. The cure system as defined in claim 7, wherein the curing agent is a liquid at a temperature in a range of from about 25 degrees Celsius to about 35 degrees Celsius.

9. The cure system as defined in claim 1, wherein the refractory solid comprises silica.

10. The cure system as defined in claim 9, wherein the silica comprises silica particles.

11. The cure system as defined in claim 10, wherein the silica particles have an average particle size that is nano-scale.

12. The cure system as defined in claim 11, wherein the silica particles have an average particle size in a range of less than about 100 nanometers.

13. The cure system as defined in claim 1, further comprising a catalyst or an accelerator.

14. The cure system as defined in claim 1, further comprising one or more of pigment, reactive diluent, defoamer, flow modifier, flexibilizer, or flame retardant.

15. The cure system as defined in claim 1, further comprising an adhesion promoter.

16. The cure system as defined in claim 1, wherein the solid comprises one or both of alumina or boron nitride.

17. The cure system as defined in claim 1, wherein the solid is present in an amount in a range of greater than about 30 weight percent based on the total weight of the composition.

18. The cure system as defined in claim 17, wherein the solid is present in an amount in a range of from about 30 weight percent to about 70 weight percent based on the total weight of the composition.

19. An adhesive system comprising the cure system as defined in claim 1, and further comprising a curable resin.

20. The adhesive system as defined in claim 19, wherein the curable resin comprises one or more epoxy or oxirane moiety.

21. The adhesive system as defined in claim 20, wherein the epoxy comprises one or more aliphatic epoxy resin, cycloaliphatic epoxy resin, or aromatic epoxy resin.

22. The adhesive system as defined in claim 19, wherein the curable resin is present relative the cure system in a stoichiometric ratio in a range of about 1:1.

23. The adhesive system as defined in claim 19, wherein the curable resin comprises a filler prior to mixing with the cure system.

24. A cured polymer layer comprising the adhesive system as defined in claim 19.

25. An electronic device, comprising: a substrate; a chip secured to the substrate; and a cured polymer layer as defined in claim 24 disposed between the chip and the substrate.

26. A solvent-free adhesive system for use in an electronic device, comprising:
   a curable resin comprising a first portion of refractory solid; and
   a cure system operable to cure the resin, the cure system comprising a curing agent and a second portion of refractory solid, wherein the refractory solid is present in an amount greater than about 30 percent by weight relative to the total weight of the adhesive system and wherein the first and second portion of refractory solids each have an active termination site density that is less than about 5 per square nanometer.

27. The adhesive system as defined in claim 26, wherein a mixture of the resin and the curing agent has a viscosity at about room temperature that is sufficiently low to enable application of the mixture to a substrate surface and to use as a no-flow underfill.

* * * * *